US011370381B1

(12) United States Patent
Mihm (10) Patent No.: US 11,370,381 B1
(45) Date of Patent: Jun. 28, 2022

(54) AIRBAG HOUSING

(71) Applicant: Ford Global Technologies, LLC, Dearborn, MI (US)

(72) Inventor: Russell Joseph Mihm, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/219,932

(22) Filed: Apr. 1, 2021

(51) Int. Cl.
*B60R 21/215* (2011.01)
*B60R 21/205* (2011.01)

(52) U.S. Cl.
CPC .......... *B60R 21/215* (2013.01); *B60R 21/205* (2013.01); *B60R 2021/21537* (2013.01)

(58) Field of Classification Search
None
See application file for complete search history.

(56) References Cited

U.S. PATENT DOCUMENTS

| | | | |
|---|---|---|---|
| 5,348,343 A * | 9/1994 | Hawthorn | B60R 21/16 280/743.1 |
| 6,848,705 B2 * | 2/2005 | Schneider | B60R 21/2165 280/728.3 |
| 7,905,514 B2 * | 3/2011 | Thomas | B60R 22/1954 280/730.2 |
| 9,428,132 B2 | 8/2016 | Obadia et al. | |
| 10,457,241 B2 | 10/2019 | Weerappuli | |
| 11,040,688 B2 * | 6/2021 | Deng | B60R 21/215 |
| 11,247,632 B2 * | 2/2022 | Malapati | B60R 21/232 |

FOREIGN PATENT DOCUMENTS

JP  6035183 B2  11/2016

* cited by examiner

*Primary Examiner* — Faye M Fleming
(74) *Attorney, Agent, or Firm* — Frank A. MacKenzie; Bejin Bieneman PLC (57) ABSTRACT

An assembly includes a housing having a sidewall defining a first slot and a second slot, the sidewall having a press plate between the first slot and the second slot, the press plate movable between an initial position and a deployed position. The assembly includes an airbag supported by the housing and inflatable from an uninflated position to an inflated position, the press plate being moveable from the initial position to the deployed position by inflation of the airbag from the uninflated position to the inflated position.

20 Claims, 8 Drawing Sheets

AIRBAG HOUSING

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly includes a housing having a sidewall defining a first slot and a second slot, the sidewall having a press plate between the first slot and the second slot, the press plate movable between an initial position and a deployed position. The assembly includes an airbag supported by the housing and inflatable from an uninflated position to an inflated position. The press plate is moveable from the initial position to the deployed position by inflation of the airbag from the uninflated position to the inflated position.

The housing may include a base, the sidewall may extend from the base to a top edge, and the first slot and the second slot may extend from the top edge toward the base.

The second slot may extend toward the base beyond the first slot.

The housing may include a hinge, and the press plate may pivot about the hinge from the initial position to the deployed position.

The sidewall may include a top edge, and the hinge may be elongated transverse to the top edge.

The housing may include a base, the sidewall may extend from the base to a top edge, and the press plate may extend away from the base beyond the top edge.

The assembly may include an instrument panel, the housing may be pivotally supported by the instrument panel, the press plate may be connected to the instrument panel, and movement of the press plate from the initial position to the deployed position may pivot the housing relative to the instrument panel.

The sidewall may include a second press plate.

The sidewall may define a third slot, and the second press plate may be between the second slot and the third slot.

The assembly may include a first inflator and a second inflator, the first inflator may be at the press plate and the second inflator may be at the second press plate.

The press plate may be taller than the second press plate.

The press plate may be operatively coupled to a vehicle component, and movement of the press plate from the initial position to the deployed position may actuate the vehicle component.

The vehicle component may be a display screen movable from a first position to a second position, and movement of the press plate from the initial position to the deployed position may actuate the display screen from the first position to the second position.

The assembly may include a rod connecting the press plate to the vehicle component, the rod may be moveable from an engaged position to a disengaged position, movement of the press plate from the initial position to the deployed position may move the rod from the engaged position to the disengaged position.

The rod may include a first portion and a second portion, the first portion is engaged with the second portion in the engaged position, and the first portion is disengaged from the second portion in the disengaged position.

The first portion may be slidable within the second portion.

The sidewall may define a third slot, the sidewall may have a second press plate between the second slot and the third slot, the second press plate may be operatively coupled to a second vehicle component at a height on the second press plate that is different than a height on the press plate that is operatively coupled to the vehicle component.

The housing may include a second sidewall, the second sidewall may define a third slot and a fourth slot, the second sidewall may have a second press plate between the third slot and the fourth slot.

The press plate may be opposite the second press plate.

With reference to the Figures, wherein like numerals indicate like parts throughout the several views, an assembly 20 for a vehicle 22 includes a housing 24 having a sidewall 26 defining first and second slots 28. The sidewall 26 has a press plate 30 between the first slot 28 and the second slot 28. The press plate 30 is movable between an initial position and a deployed position. The assembly 20 includes an airbag 32 supported by the housing 24 and inflatable from an uninflated position to an inflated position. The press plate 30 is moveable from the initial position to the deployed position by inflation of the airbag 32 from the uninflated position to the inflated position Movement of the press plate 30 from the initial position to the deployed position enables one or more vehicle components that are operatively coupled to the press plate 30 to be actuated via inflation of the airbag 32, e.g., such that inflation of the airbag 32 moves a component from one position to another.

Figure 1:
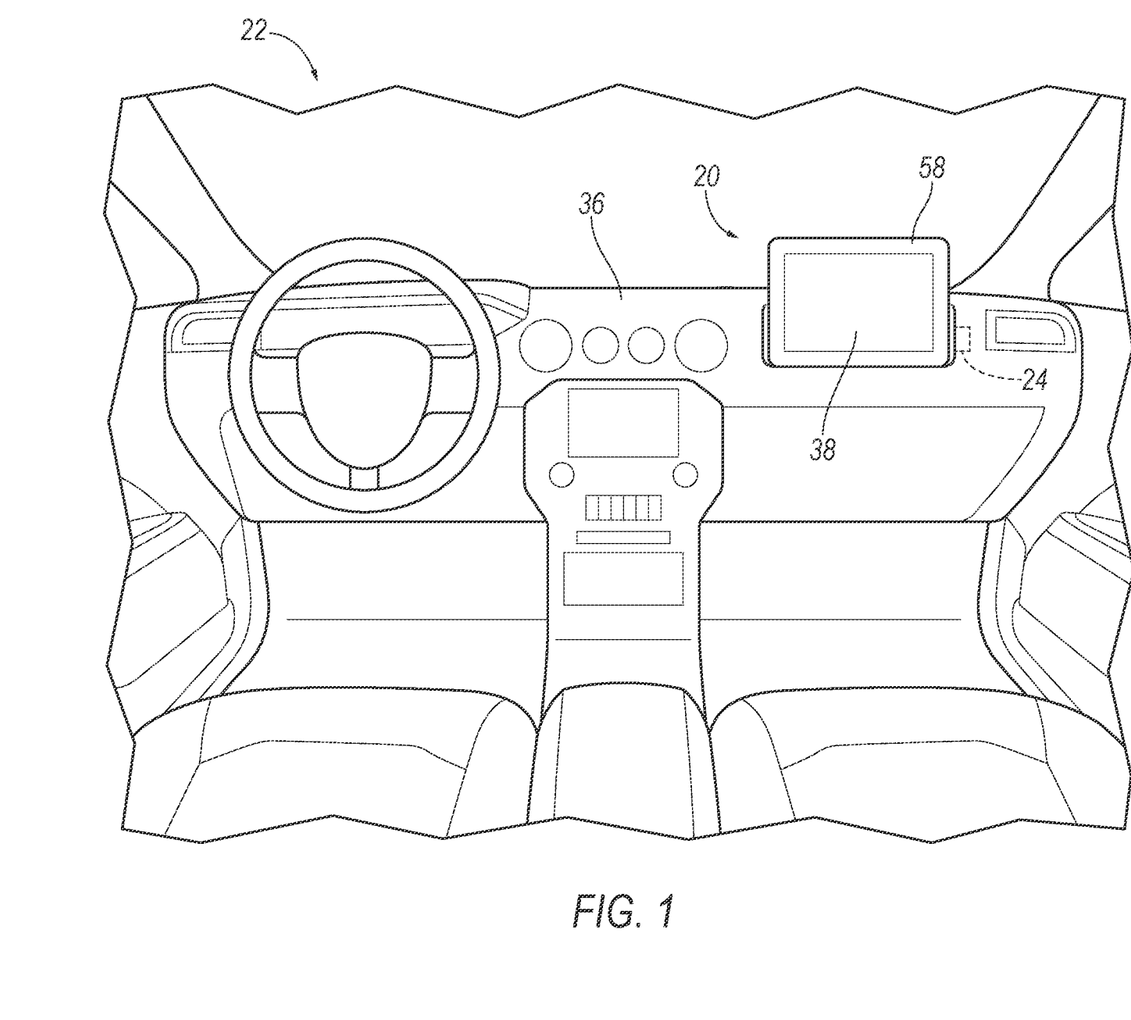
FIG. 1 is a perspective view of a vehicle passenger compartment with an instrument panel supporting an airbag housing.
Figure 2:
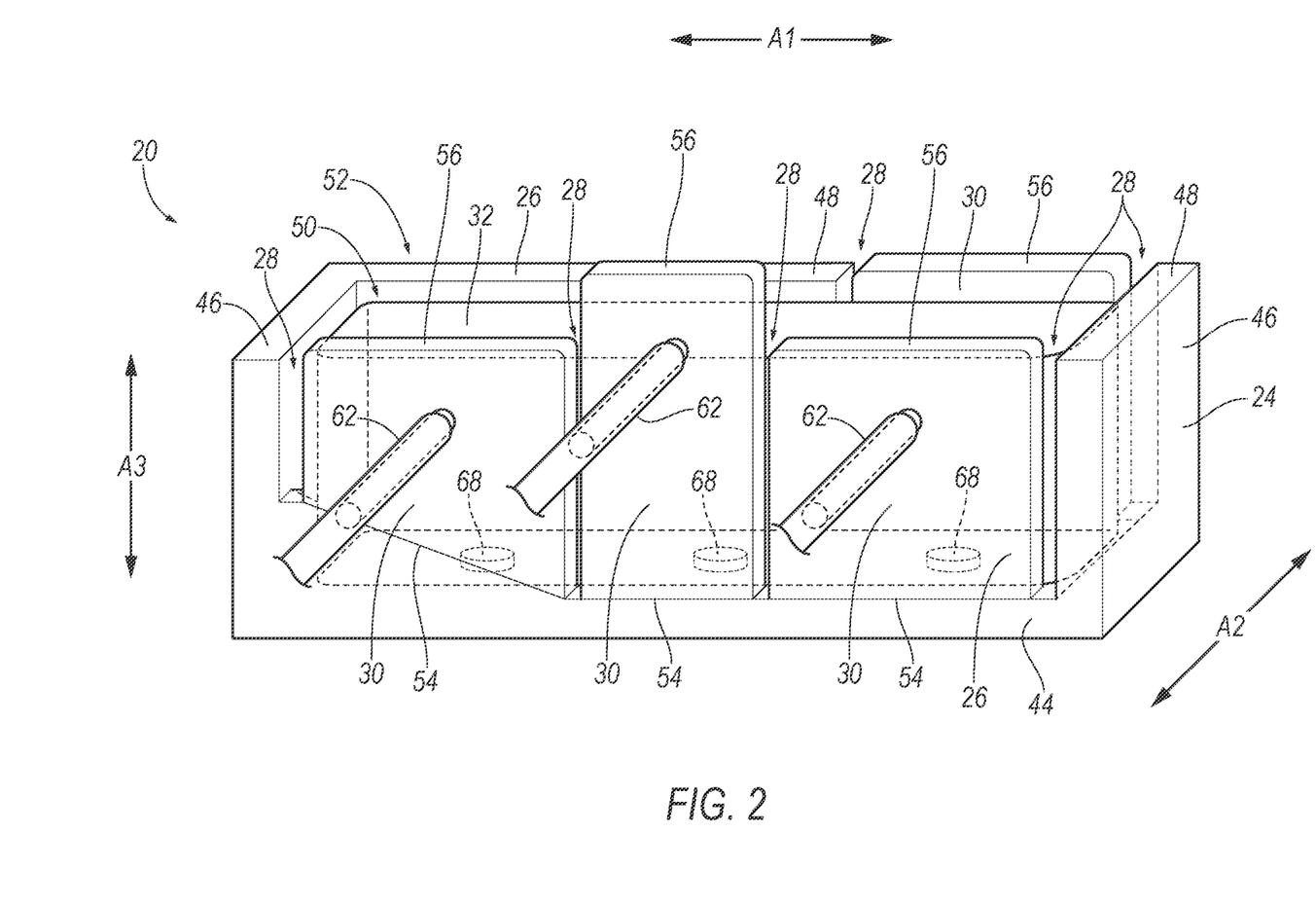
FIG. 2 is a perspective view of the airbag housing with press plates in initial positions.
Figure 3:
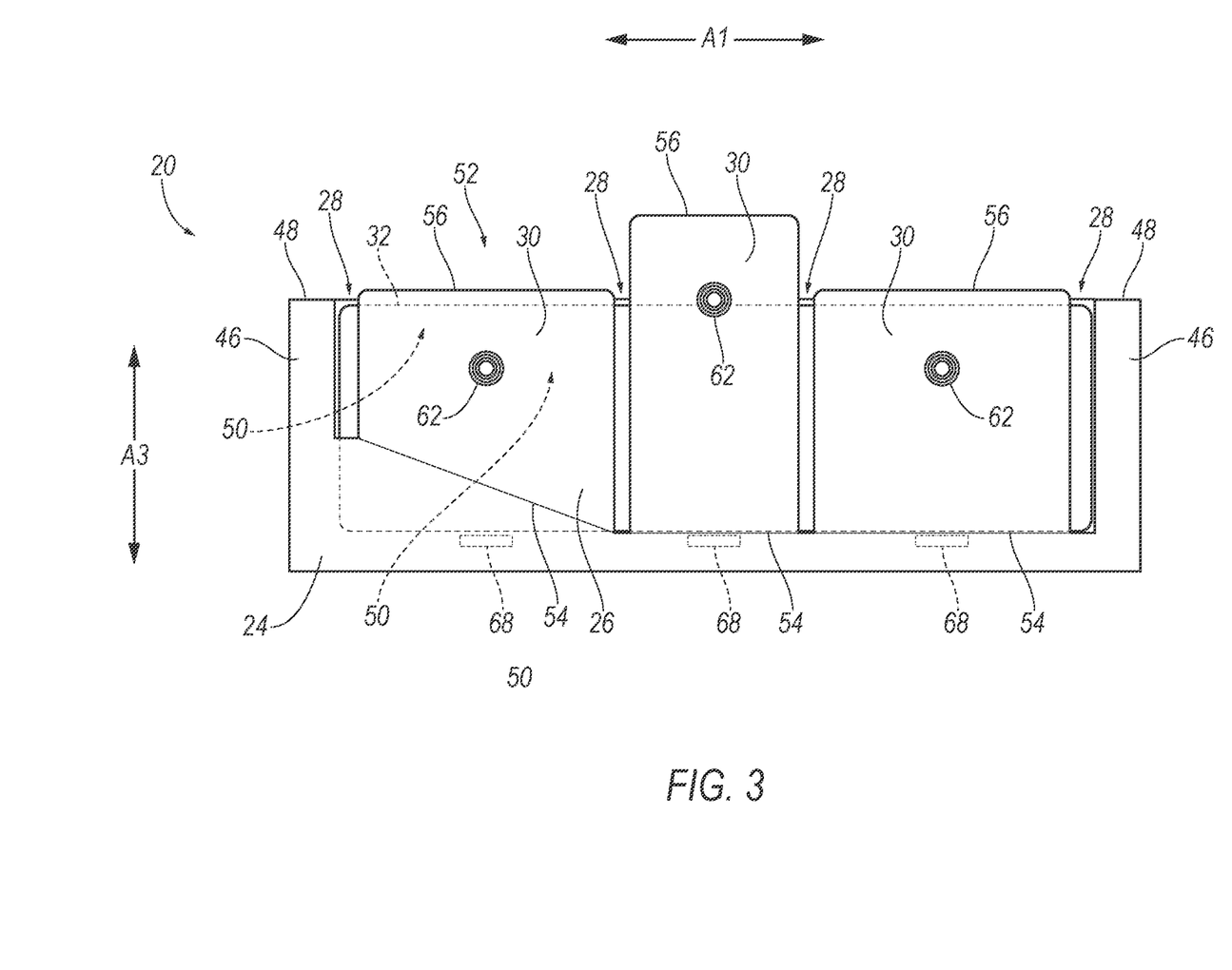
FIG. 3 is a side view of the airbag housing with the press plates in the initial positions.
Figure 4:
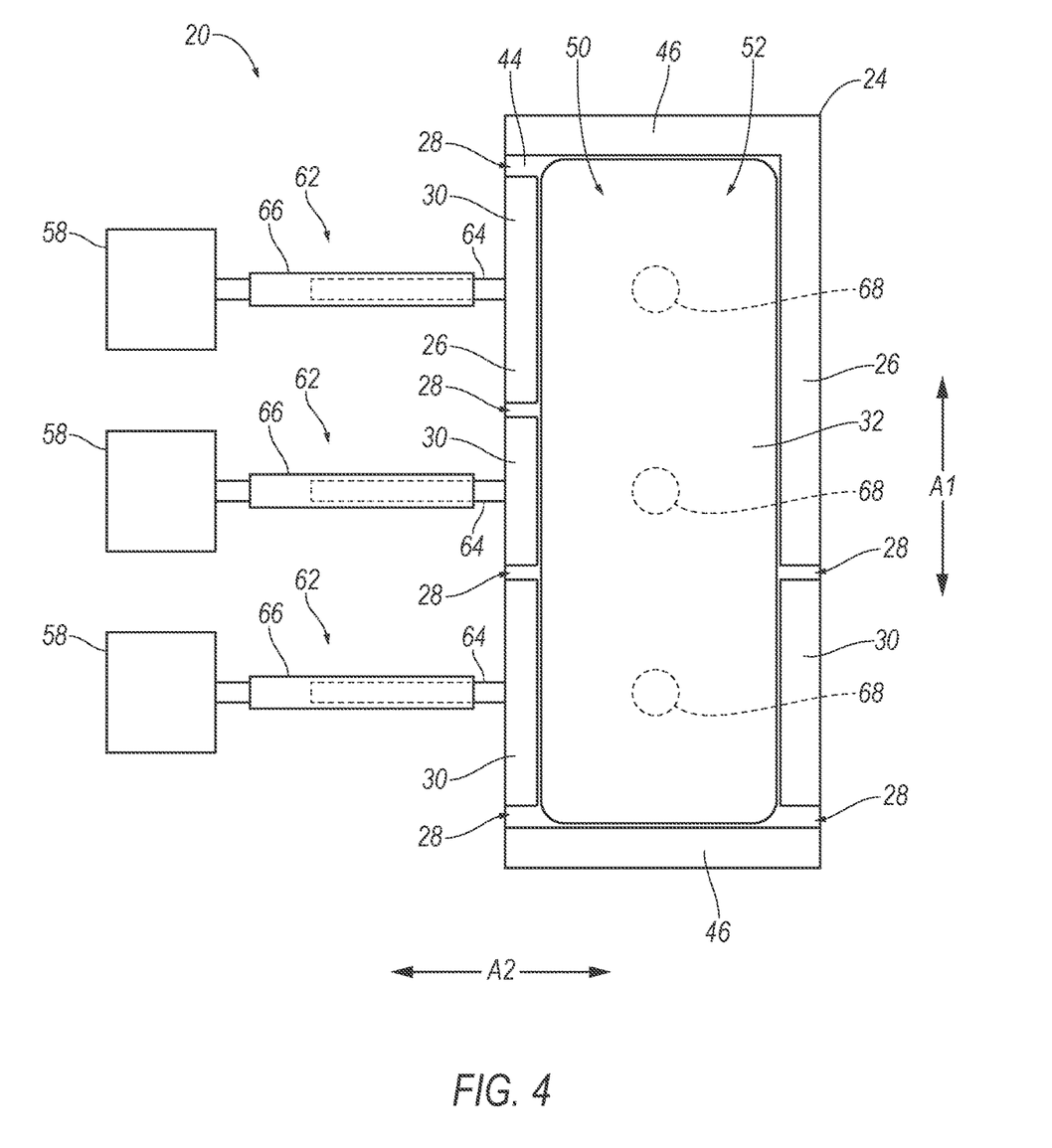
FIG. 4 is a top view of the airbag housing with the press plates in the initial positions.
Figure 5:
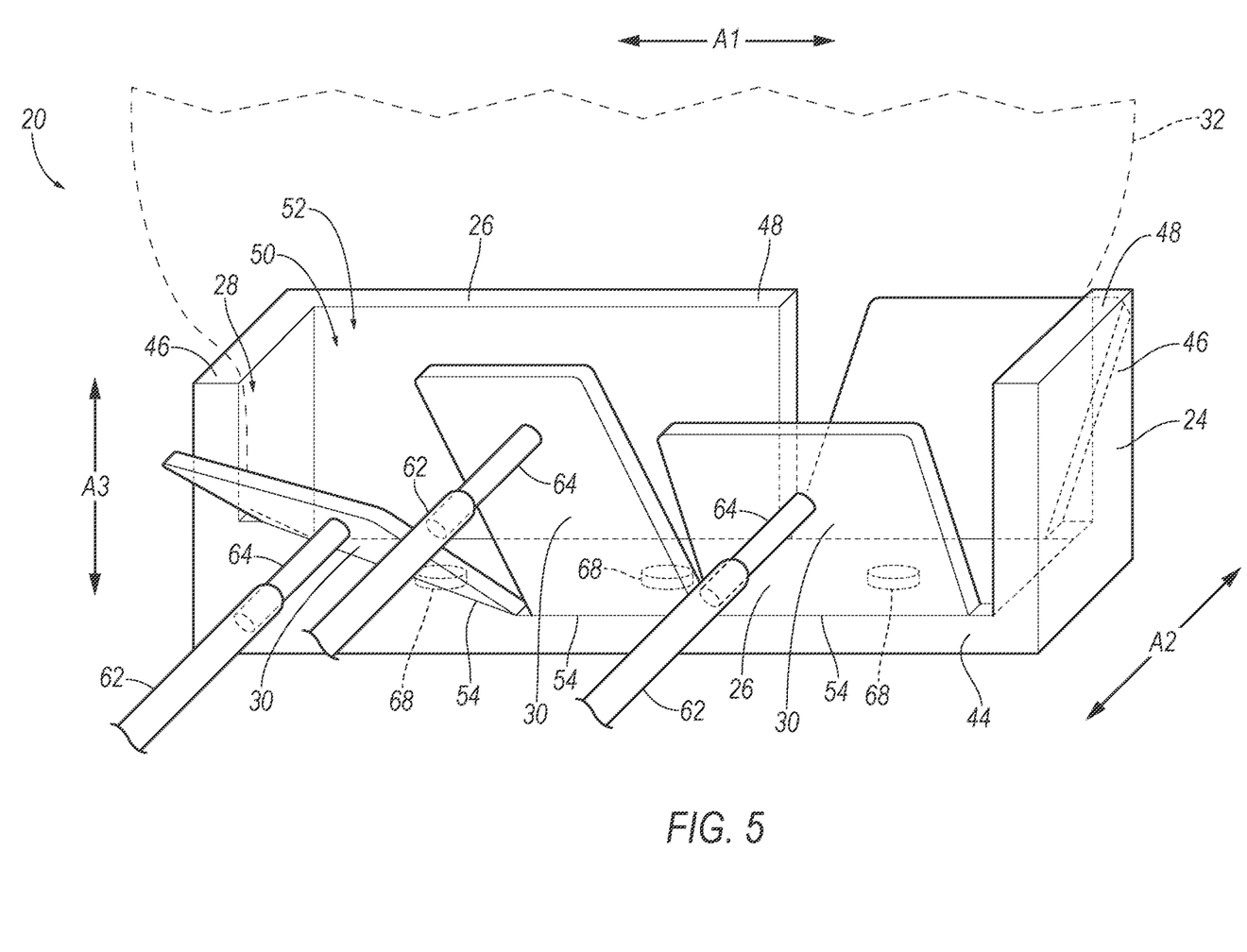
FIG. 5 is a perspective view of the airbag housing with the press plates in deployed positions.
Figure 6:
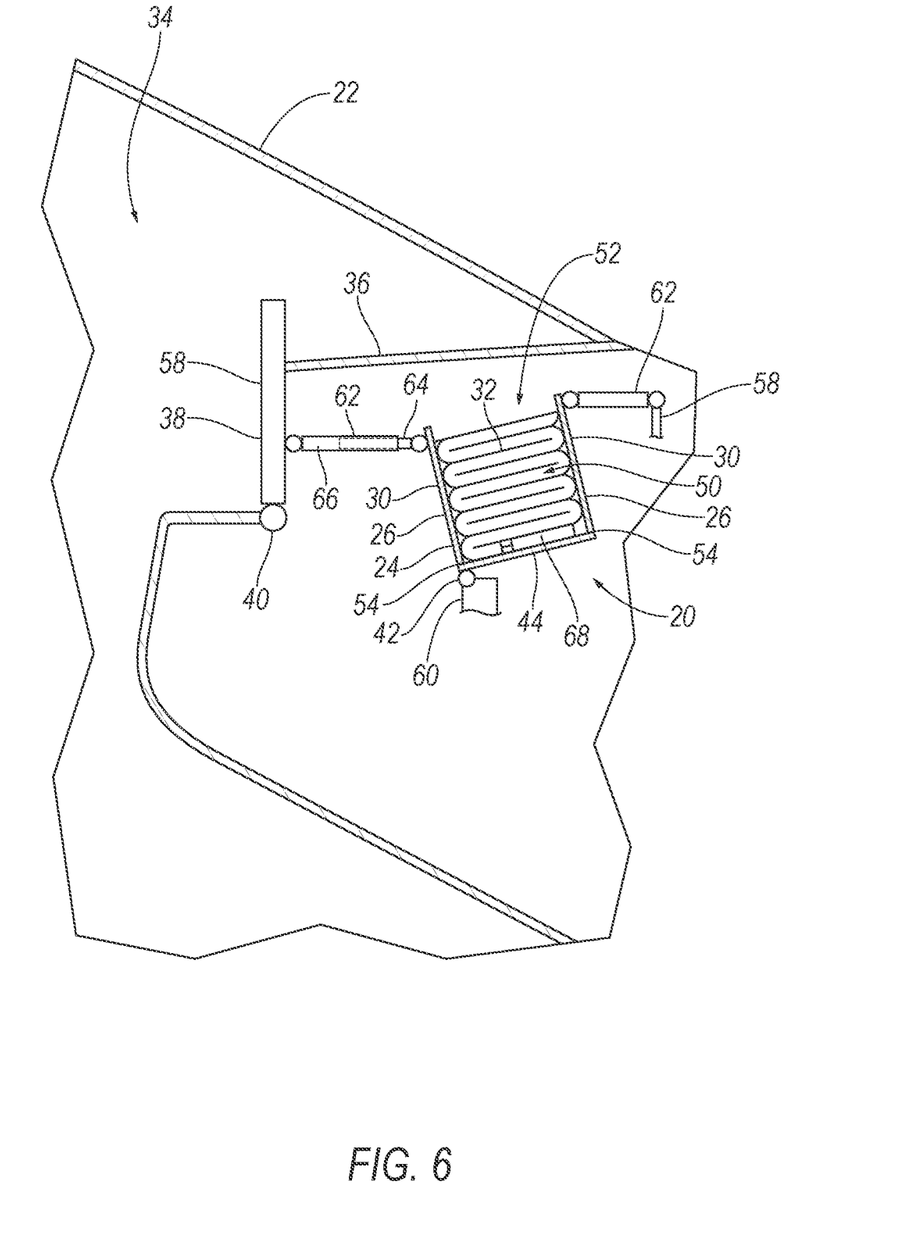
FIG. 6 is a cross section of the instrument panel supporting the airbag housing with the press plates in the initial positions.
Figure 7:
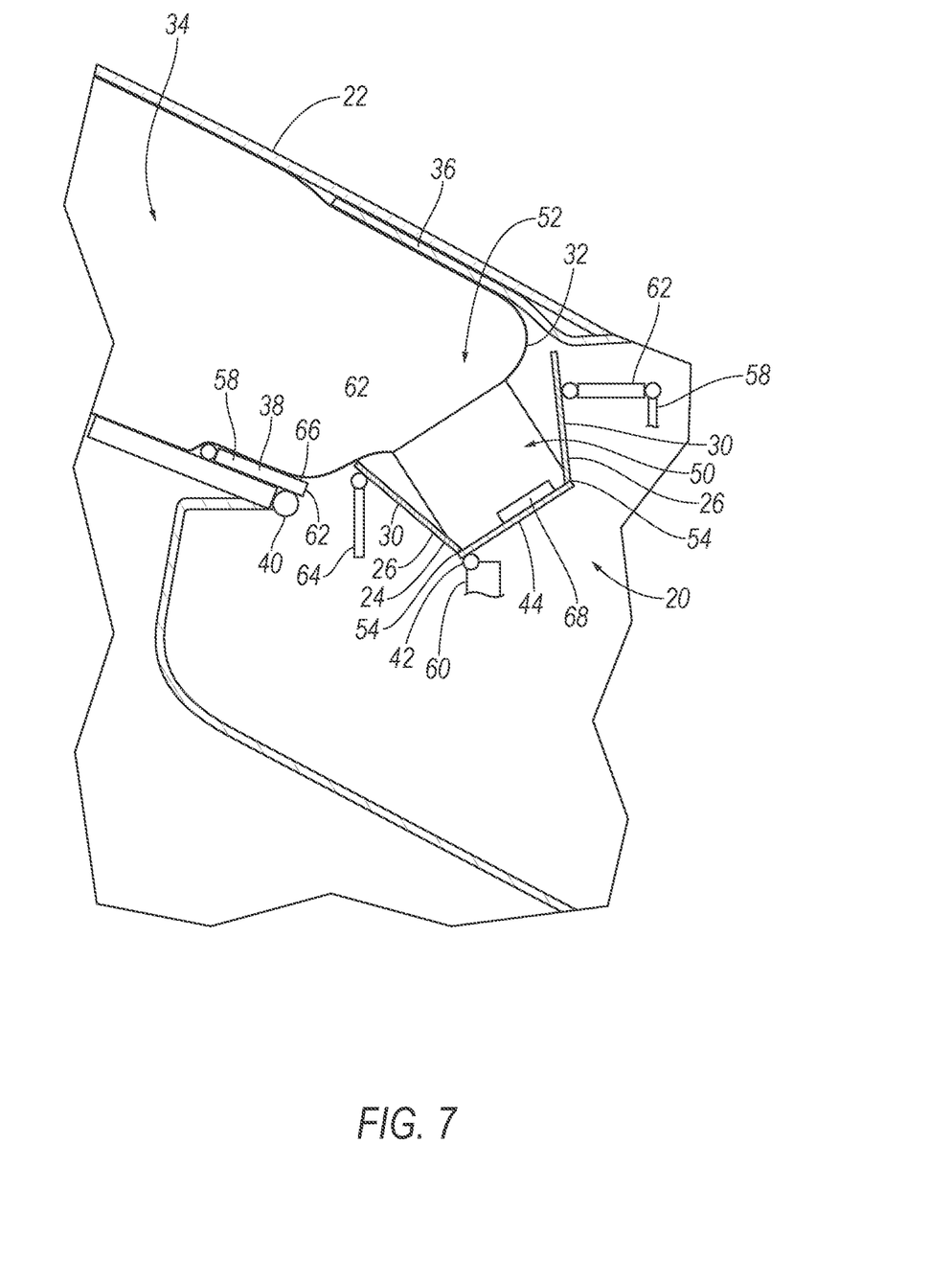
FIG. 7 is a cross section of the instrument panel supporting the airbag housing with the press plates in the deployed positions.

With reference to FIGS. 1, 6, and 7, the vehicle 22 may be any suitable type of automobile, e.g., a passenger or commercial automobile such as a sedan, a coupe, a truck, a sport utility vehicle, a crossover vehicle, a van, a minivan, a taxi, a bus, etc. The vehicle 22, for example, may be an autonomous vehicle. In other words, the vehicle 22 may be autonomously operated such that the vehicle 22 may be driven without constant attention from a driver, i.e., the vehicle 22 may be self-driving without human input.

The vehicle 22 includes a passenger compartment 34. The passenger compartment 34 houses occupants, if any, of the vehicle 22. For example, seats of the occupants may be supported in passenger compartment 34. The passenger compartment 34 may extend across the vehicle 22, i.e., from a right side to a left side of the vehicle 22. The passenger compartment 34 includes a front end and a rear end with the front end being in front of the rear end during forward movement of the vehicle 22.

A display screen 38 may be supported by, for example, the instrument panel 36. The display screen 38 is a human-machine interface ("HMI") screen that displays messages and images to the occupants in the passenger compartment 34. For example, the display screen 38 may be an LCD display, and LED display, a plasma display, etc. The display screen 38 may receive messages from the occupants, e.g., the display screen 38 may be touch sensitive. The display screen 38 may be movable from a first position, shown in FIG. 6, to a second position, shown in FIG. 7. For example, the display screen 38 may be supported by the instrument panel 36 at a pivot 40. The display screen 38 may rotate about the pivot 40 from the first position to the second position.

The housing 24 packages the airbag 32 in the uninflated position. The housing 24 may provide a reaction surface for the airbag 32 in the inflated position. The housing 24 may be formed of any material, e.g., a rigid polymer, a metal, a composite, etc. The housing 24 may be fixed to any suitable structure of the vehicle 22, such as the instrument panel 36, steering wheel, pillar, seat, roof, floor, etc. The housing 24 may be pivotally supported by the instrument panel 36 and movable from a first position, shown in FIG. 6, to a second position, shown in FIG. 7. For example, the housing 24 may be supported by the instrument panel 36 at a pivot 42. The housing 24 may rotate about the pivot 42 from the first position to the second position.

With reference to FIGS. 2-5, the housing 24 may include a base 44. the base 44 may extend along a longitudinal axis A1 and a lateral axis A2 perpendicular to the longitudinal axis A1. The base 44 may be elongated along the longitudinal axis A1. In other words, a length of the base 44 along the longitudinal axis A1 may be greater than a width of the base 44 along the lateral axis A2.

The housing 24 includes one or more sidewalls 26 and may include one or more end walls 46. The sidewalls 26 may each extend away from the base 44 e.g., along a vertical axis A3 that is perpendicular to the longitudinal axis A1 and the lateral axis A2. The sidewalls 26 may extend from the base 44 to a top edge 48 of the housing 24. The sidewalls 26 may extend along the longitudinal axis A1. The sidewalls 26 may extend from one end wall 46 to another end wall 46. The sidewalls 26 may be spaced from each other along the lateral axis A2. The end walls 46 each away extend from the base 44, e.g., along the vertical axis A3. The end walls 46 may each extend from the base 44 to the top edge 48 of the housing 24. The end walls 46 may extend along the lateral axis A2, e.g., from one of the sidewalls 26 to the other of the sidewalls 26. The end walls 46 are spaced from each other, e.g., along the longitudinal axis A1.

The base 44, the sidewalls 26, and the end walls 46 may be unitary, i.e., a single, uniform piece of material with no seams, joints, fasteners, or adhesives holding it together. Specifically, the base 44, the sidewalls 26, and the end walls 46 are formed together simultaneously as a single continuous unit, e.g., by machining from a unitary blank, molding, forging, casting, stamping, etc. Non-unitary components, in contrast, are formed separately and subsequently assembled, e.g., by threaded engagement, welding, etc.

The base 44, the sidewalls 26, and the end walls 46 define a cavity 50. For example, the cavity 50 may be between the sidewalls 26 along the lateral axis A2, and between the end walls 46 along the longitudinal axis A1. The base 44 may define a bottom of the cavity 50. The cavity 50 may include an open top 52, e.g., at the top edge 48. In other words, the top edge 48 may surround the open top 52, e.g., along the longitudinal axis A1 and the lateral axis A2. The open top 52 may be opposite the base 44 relative to the cavity 50 along the vertical axis A3.

The sidewalls 26 may each include one or more press plates 30. The press plates 30 are each movable from initial positions, shown in FIGS. 2-4 and 6, outward away from the cavity 50 to a deployed position, shown in FIGS. 5 and 7. For example, the housing 24 may include one or more hinges 54. Each press plate 30 may pivot about a respective one of the hinges 54 from the initial position to the deployed position. The hinge 54 may be elongated transverse to the top edge 48. In other words, the top edge 48 and the hinge 54 may not extend parallel to each other. For example, the top edge 48 may extend along the longitudinal axis A1 and the hinge 54 may extend diagonally along the longitudinal axis A1 and the vertical axis A3. The elongation of the hinge 54, e.g., parallel to the top edge 48, transverse to the top edge 48, etc., defines a movement path of the press plate 30 from the initial position to the deployed position. The hinge 54 may be, for example, a living hinge.

The press plates 30 may be of different heights, i.e., one of the press plates 30 may taller than another of the press plates 30. In other words, one of the press plates 30 may extend farther away from the base 44 along the vertical axis A3 than another of the press plates 30. One of the press plates 30 may extend away from the base 44 beyond the top edge 48 of the housing 24 adjacent such press plate 30. The different heights enable various force amounts and stroke lengths of the provided by movement of the press plates 30. For example, a taller press plate 30 will provide relatively greater length of movement and less force at the top edge 48 than a shorter press plate 30

One of the press plates 30 may be opposite another of the press plates 30 relative to cavity 50. For example, the press plate 30 of one of the sidewalls 26 and the press plate 30 of the other of the sidewalls 26 may be at a common position along the longitudinal axis A1 with the cavity 50 therebetween. The opposing press plates 30 enable application of force and movement in opposite directions, e.g., with the opposing press plate 30 moving from the initial positions away from each other to the deployed positions.

Slots 28 defined by the sidewalls 26 are located on opposing sides of the press plates 30. For example, each press plate 30 may be between first and second slots 28 along the longitudinal axis A1. Sidewalls 26 may share slots 28, e.g., two sidewalls 26 may be located at spacings between three slots 28. In other words, the sidewall 26 may include a first press plate 30 between a first slot 28 and a second slot 28, and a second press plate 30 between the second slot 28 and a third slot 28. The slots 28 may be open at the top edge 48. The slots 28 may each extend from the top edge 48 toward the base 44, e.g., along the vertical axis A3 to distal ends 56. The slots 28 may be of different lengths. In other words, one of the slots 28 may extend toward the base 44 beyond another of the slots 28. For example, the distal end 56 of one slot 28 may be closer to the base 44 than the distal end 56 of another of the slots 28. Each of the hinges 54 may extend from the distal end 56 of one of the slots 28 to the distal end 56 of another of the slots 28.

The press plates 30 are operatively coupled to various vehicle components 58, i.e., such that force produced by movement of the press plates 30 from the initial positions to the deployed positions is applied to the various vehicle components 58. The various vehicle components 58 are different than each other. In other words, one of the press plates 30 may be operatively coupled to one vehicle component 58, and another of the press plates 30 may be coupled to a different vehicle component 58. For example, one of the press plates 30 may be connected to the instrument panel 36. Such press plate 30 may be fixed to a crossbeam 60 or other structure of the instrument panel 36. Movement of the press plate 30 connected to the instrument panel 36 from the initial position to the deployed position may rotate the housing 24 about the pivot 42 from the first position to the second position. As another example, one of the press plates 30 may be connected to the display screen 38 such that movement of the press plate 30 connected to the display screen 38 from the initial position to the deployed position may rotate the display screen 38 about the pivot 40 from the first position to the second position. As another example, one or more of the press plates 30 may be connected to one or more switches (not shown). Movement of the press plates 30 may toggle the switches, e.g., between on and off positions to close or open an electronic circuit, and actuate any other system controlled by such switches.

Rods 62, or other suitable structure than can transmit force and/or motion, may operatively couple the press plate 30 to the various vehicle components 58. For example, one of the rods 62 may connect one of the press plates 30 to one of the vehicle components 58, and another of the rods 62 may connect another of the press plates 30 to another of the vehicle components 58.

Each rod 62 may be moveable from an engaged position, shown in FIG. 6, to a disengaged position, shown in FIG. 7. The rod 62 in the engaged position transmits movement and/or force from the press plate 30 to the vehicle component 58. The rod 62 in the disengaged position does not transmit movement and/or force from the press plate 30 to the vehicle component 58. For example, the rod 62 may include includes a first portion 64 and a second portion 66. The first portion 64 may be engaged with the second portion 66 in the engaged position and disengaged from the second portion 66 in the disengaged position. For example, the first portion 64 may be a shaft slidable within a hollow cylindrical body of the second portion 66, e.g., in a telescoping arrangement. The first portion 64 and the second portion 66 (including the shaft and hollow body) may be other shapes, e.g., rectangular in cross section. When the rod 62 is subject to compression, e.g., when the press plate 30 moves from the initial position to the deployed position, the first portion 64 may be urged toward the second portion 66 and may maintain engagement, e.g., the first portion 64 may maintain disposition within the second portion 66 and transfer force from the press plate 30 to the vehicle component 58. When the rod 62 is subject to tension, e.g., when the press plate 30 moves from the deployed position back toward the initial position, the first portion 64 may slide away from and out of engagement with the second portion 66 and not transfer force from the press plate 30 to the vehicle component 58. For example, the first portion 64 may be separated from the second portion 66 in the disengaged position.

The press plates 30 may be operatively coupled to the vehicle components 58 at various heights. In other words, one of the press plates 30 may be operatively coupled at one height, and another of the press plates 30 may be operatively coupled at a different height. For example, a distance along the vertical axis A3 between the hinge 54 of one of the press plates 30 and the rod 62 connected such press plate 30 may be different that a distance along the vertical axis A3 between the hinge 54 of another of the press plates 30 and the rod 62 connected such press plate 30. The different heights enable various force amounts and stroke lengths of the provided by movement of the press plates 30. For example, coupling at a taller height will provide relatively greater length of movement and less force than coupling at a shorter height.

The airbag 32 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 32 is supported by the housing 24. The airbag 32 is inflatable from the uninflated position, shown in FIG. 6, to the inflated position, shown in FIG. 7. The airbag 32 in the uninflated position is disposed in the cavity 50. For example, the airbag 32 in the uninflated position may be between the sidewalls 26 along the lateral axis A2, between the end walls 46 along the longitudinal axis A1, and between the base 44 and the open top 52 along the vertical axis A3. The airbag 32 in the inflated position extends out of the cavity 50 through the open top 52, e.g., along the vertical axis A3. In other words, the airbag 32 in the inflated position is outside the cavity 50, e.g., with the open top 52 between the airbag 32 and the housing 24.

One or more inflators 68 may be in fluid communication with the airbag 32. The inflators 68 expand the airbag 32 with inflation medium, such as a gas, to move the airbag 32 from the uninflated position to the inflated position. The inflator 68 be supported by any suitable component. For example, the inflator 68 may be supported by the housing 24 in the cavity 50. The inflators 68 may be aligned with the press plates 30, e.g., at common positions along the longitudinal axis A1 with the press plates 30. For example, one of the inflators 68 may be at a common position along the longitudinal axis A1 with one of the press plates 30 and another of the inflators 68 may be at a common position along the longitudinal axis A1 with another of the press plates 30. Each inflator 68 may be, for example, a pyrotechnic inflator that ignites a chemical reaction to generate the inflation medium, a stored gas inflator that releases (e.g., by a pyrotechnic valve) stored gas as the inflation medium, or a hybrid. The inflators 68 may be, for example, at least partially in an inflation chamber of the airbag 32 to deliver inflation medium directly to the inflation chamber or may be connected to the inflation chamber through fill tubes, diffusers, etc. The inflators 68 may inflate the airbag 32 in response to receiving a command from a computer 70, e.g., transmitted upon an impact to the vehicle 22 and detected with an impact sensor 72.

Figure 8:
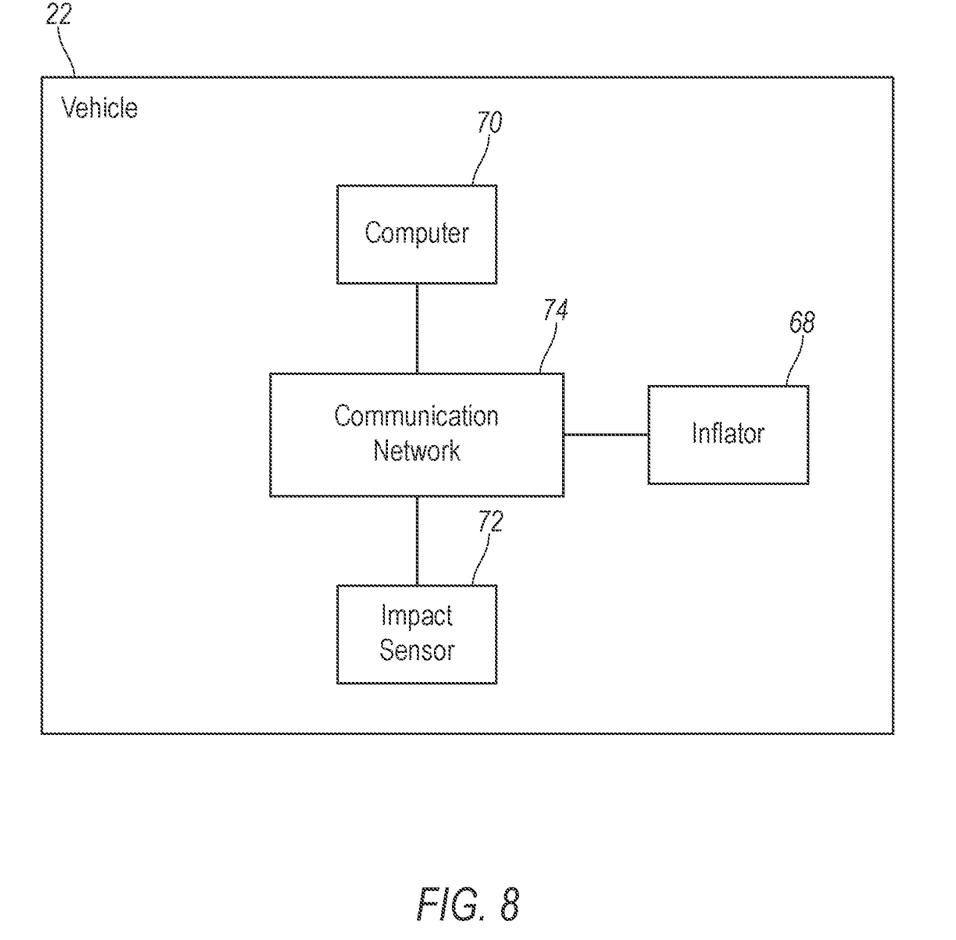
FIG. 8 is a block diagram of components of the vehicle.

With reference to FIG. 8, the vehicle 22 may include one or more impact sensors 72 configured to detect an impact to the vehicle 22. The impact sensors 72 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors 72 may be located at numerous points in or on the vehicle 22.

The computer 70 is a microprocessor-based controller implemented via circuits, chips, or other electronic components. The computer 70 includes a processor and a memory such as are known. The memory includes one or more forms of computer readable media, and stores instructions executable by the computer 70 for performing various operations, including as disclosed herein. The computer 70 may be programmed to execute operations disclosed herein. Specifically, the memory stores instructions executable by the processor to execute the operations disclosed herein and electronically stores data and/or databases. For example, the computer 70 may include one or more dedicated electronic circuit including an ASIC (Application Specific Integrated Circuit) that is manufactured for a particular operation. In another example, the computer 70 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer 70 may be a set of computers communicating with one another.

The computer 70 is generally arranged for communications on a communication network 74 that can include a bus in the vehicle 22 such as a controller area network (CAN) or the like, and/or other wired and/or wireless mechanisms. Via the communication network 74, the computer 70 may transmit messages to various devices in the vehicle 22, and/or receive messages (e.g., CAN messages) from the various devices, e.g., the inflators 68, the impact sensors 72, etc. Alternatively or additionally, in cases where the computer 70 comprises a plurality of devices, the communication network 74 may be used for communications between devices represented as the computer 70 in this disclosure.

The computer 70 may be programmed to inflate the airbag 32. For example, under normal operating conditions of the vehicle 22, the airbag 32 is in the uninflated position. In the event of an impact, the impact sensor 72 may detect the impact and transmit a signal through the communication network 74 to the computer 70. In response to receiving such signal, the computer 70 may transmit a signal through the communication network 74 to the inflators 68 to inflate the airbag 32. In response to receiving such signal, the inflators 68 may discharge and inflate the airbag 32 to the inflated position to control kinematics the occupant.

Inflation of the airbag 32 from the uninflated position to the inflated position moves the press plates 30 from the initial positions to the deployed positions. For example, force provided by the inflator 68 filling the inflation chamber with inflation medium may urge the press plates 30 outward and away from the chamber.

Movement of the press plate 30 from the initial position to the deployed position may actuates the vehicle component 58. For example, movement of the press plate 30 the initial position to the deployed position may transmit force via one of the rods 62 to the display screen 38 and actuate the display screen 38 from the first position to the second position. As another example, movement of the press plate 30 from the initial position to the deployed position may transmit force via one of the rods 62 to the instrument panel 36 and actuate pivotal movement the housing 24 relative to the instrument panel 36 from the first position to the second position.

Movement of the press plates 30 from the initial positions to the deployed positions may move the rod 62 from the engaged position to the disengaged position. For example, after the moving to the deployed position, the press plate 30 may rebound toward the initial conditional and apply tension to the rod 62 connected to the press plate 30. The tension may urge the first portion 64 of the to slide away from, and out of engagement with, the second portion 66.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a housing having a base and a sidewall extending upward from the base to an open top, the sidewall defining a first slot and a second slot, the sidewall having a press plate between the first slot and the second slot, the press plate movable between an initial position and a deployed position, the press plate in the initial position extending upward away from the base toward the open top; and
    an airbag supported by the housing and inflatable from an uninflated position to an inflated position, the press plate being moveable from the initial position to the deployed position by inflation of the airbag from the uninflated position to the inflated position.

2. The assembly of claim 1, wherein the housing includes a base, wherein the sidewall extends from the base to a top edge, and wherein the first slot and the second slot extend from the top edge toward the base.

3. The assembly of claim 2, wherein the second slot extends toward the base beyond the first slot.

4. The assembly of claim 1, wherein the housing includes a hinge, and the press plate pivots about the hinge from the initial position to the deployed position.

5. The assembly of claim 4, wherein the sidewall includes a top edge, and the hinge is elongated transverse to the top edge.

6. The assembly of claim 1, wherein the housing includes a base, wherein the sidewall extends from the base to a top edge, and wherein the press plate extends away from the base beyond the top edge.

7. The assembly of claim 1, further comprising an instrument panel, wherein the housing is pivotally supported by the instrument panel, wherein the press plate is connected to the instrument panel, and wherein movement of the press plate from the initial position to the deployed position pivots the housing relative to the instrument panel.

8. The assembly of claim 1, wherein the housing includes a second side wall opposite the sidewall and the sidewall includes a second press plate.

9. The assembly of claim 8, wherein the sidewall defines a third slot, and wherein the second press plate is between the second slot and the third slot.

10. The assembly of claim 8, further comprising a first inflator and a second inflator, the first inflator at the press plate and the second inflator at the second press plate.

11. The assembly of claim 8, wherein the press plate is taller than the second press plate.

12. The assembly of claim 1, wherein the press plate is operatively coupled to a vehicle component, and wherein movement of the press plate from the initial position to the deployed position actuates the vehicle component.

13. The assembly of claim 12, wherein the vehicle component is a display screen movable from a first position to a second position, and wherein movement of the press plate from the initial position to the deployed position actuates the display screen from the first position to the second position.

14. The assembly of claim 12, further comprising a rod connecting the press plate to the vehicle component, the rod moveable from an engaged position to a disengaged position, wherein movement of the press plate from the initial position to the deployed position moves the rod from the engaged position to the disengaged position.

15. The assembly of claim 14, wherein the rod includes a first portion and a second portion, wherein the first portion is engaged with the second portion in the engaged position, and wherein the first portion is disengaged from the second portion in the disengaged position.

16. The assembly of claim 15, wherein the first portion is slidable within the second portion.

17. The assembly of claim 12, wherein the sidewall defines a third slot, wherein the sidewall has a second press plate between the second slot and the third slot, wherein the second press plate is operatively coupled to a second vehicle component at a height on the second press plate that is different than a height on the press plate that is operatively coupled to the vehicle component.

18. The assembly of claim 1, wherein the housing includes a second sidewall, wherein the second sidewall defines a third slot and a fourth slot, wherein the second sidewall has a second press plate between the third slot and the fourth slot.

19. The assembly of claim 18, wherein the press plate is opposite the second press plate.

20. An assembly, comprising:
a housing having a sidewall defining a first slot and a second slot, the sidewall having a press plate between the first slot and the second slot, the press plate movable between an initial position and a deployed position;
an airbag supported by the housing and inflatable from an uninflated position to an inflated position, the press plate being moveable from the initial position to the deployed position by inflation of the airbag from the uninflated position to the inflated position; and
a display screen movable from a first position to a second position, the press plate operatively coupled to the display screen such that movement of the press plate from the initial position to the deployed position actuates the display screen from the first position to the second position.

* * * * *